(12) United States Patent
Fujimoto

(10) Patent No.: US 8,029,366 B2
(45) Date of Patent: Oct. 4, 2011

(54) GAMING MANAGEMENT SYSTEM

(75) Inventor: Jun Fujimoto, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1214 days.

(21) Appl. No.: 11/372,083

(22) Filed: Mar. 10, 2006

(65) Prior Publication Data

US 2006/0205495 A1  Sep. 14, 2006

(30) Foreign Application Priority Data

Mar. 11, 2005  (JP) ................................. 2005-069376

(51) Int. Cl.
*A63F 13/10*  (2006.01)
*A63F 13/12*  (2006.01)

(52) U.S. Cl. ................ 463/42; 463/16; 463/24; 463/25; 463/29; 705/4

(58) Field of Classification Search ............... 463/29, 463/42, 24, 25, 46, 47, 16; 705/4
See application file for complete search history.

(56) References Cited

U.S. PATENT DOCUMENTS

| | | | |
|---|---|---|---|
| 5,429,361 A * | 7/1995 | Raven et al. ............ | 463/25 |
| 5,910,048 A | 6/1999 | Feinberg | |
| 2003/0119585 A1 | 6/2003 | Walker et al. | |
| 2003/0220138 A1 | 11/2003 | Walker et al. | |
| 2004/0152518 A1 | 8/2004 | Kogo | |

FOREIGN PATENT DOCUMENTS

| | | |
|---|---|---|
| JP | 4-244178 | 9/1992 |
| RU | 2 105 586 C1 | 2/1998 |

OTHER PUBLICATIONS

U.S. Appl. No. 11/363,079, filed Feb. 28, 2006, Fujimoto.
U.S. Appl. No. 11/372,088, filed Mar. 10, 2006, Fujimoto.
U.S. Appl. No. 11/372,089, filed Mar. 10, 2006, Fujimoto.

* cited by examiner

*Primary Examiner* — Peter DungBa Vo
*Assistant Examiner* — Damon Pierce
(74) *Attorney, Agent, or Firm* — Oblon, Spivak, McClelland, Maier & Neustadt, L.L.P.

(57) ABSTRACT

When an insurant of the game insurance attempts to play a game on another gaming machine after having played a game on one gaming machine, the member inputs and transmits information to the effect of playing a game being covered by the game insurance on another gaming machine, on condition that the insurant of the game insurance has been identified, thereby halting making of a determination as to whether or not insurance coverage of the game insurance has been paid. Subsequently, the insurant of insurance who has played a game on another gaming machine inputs and transmits information to the effect of not playing a game being covered by the game insurance on another gaming machine, thereby canceling a halt of making a determination as to whether or not insurance coverage of the game insurance is paid.

5 Claims, 10 Drawing Sheets

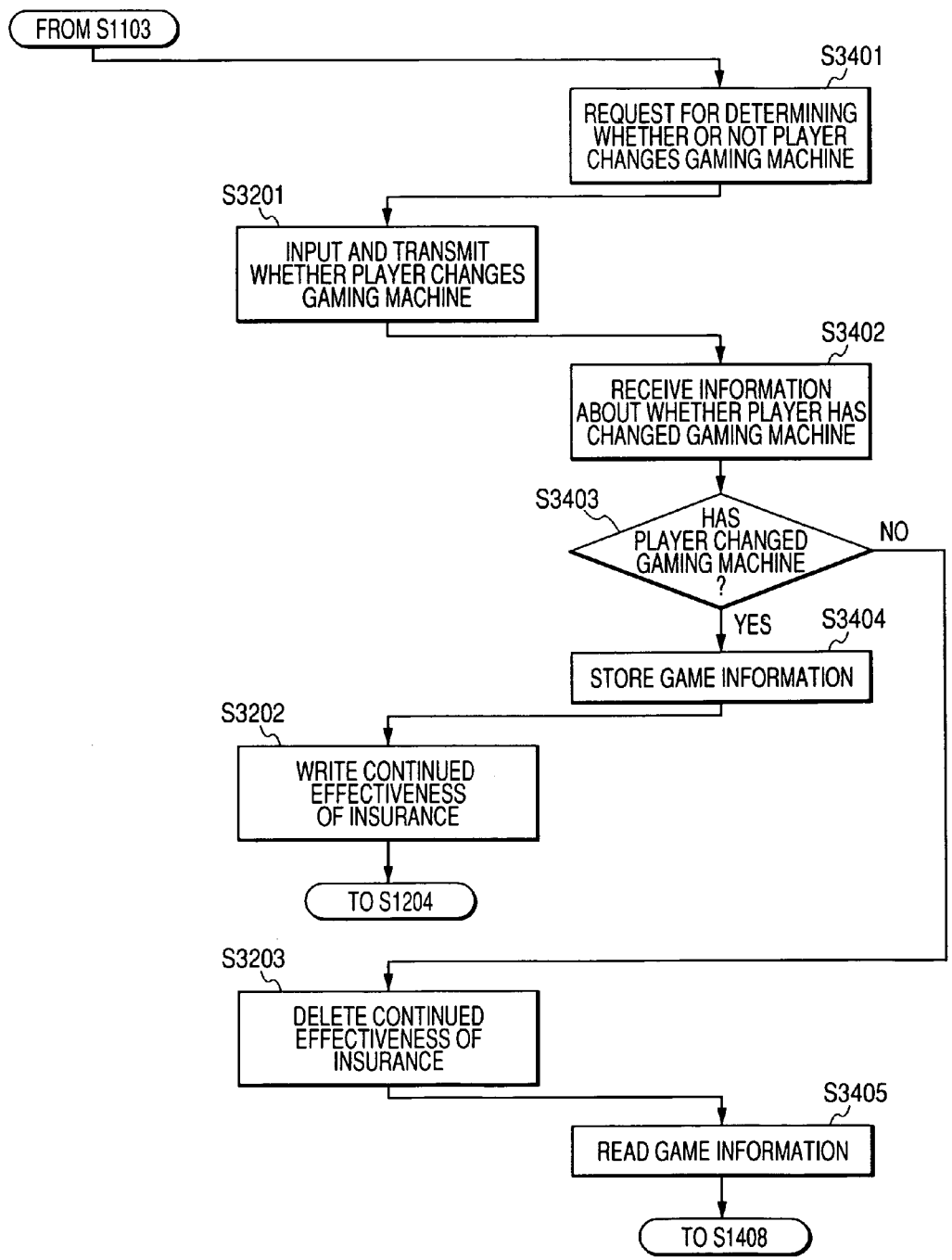

8,029,366 B2

GAMING MANAGEMENT SYSTEM

CROSS-REFERENCE TO THE RELATED APPLICATION(S)

The present application is based upon and claims priorities from prior Japanese Patent Application No. 2005-069376, filed on Mar. 11, 2005, the entire contents of which are incorporated herein by reference.

This application is related to co-pending U.S. patent application Ser. No. 11/372,088, filed Mar. 10, 2006, claiming priority on JP-2005-069432, and filed on Mar. 11, 2005. The co-pending application is expressly incorporated herein by reference.

TECHNICAL FIELD

The present invention relates to a gaming management system that manages the game insurance targeted for a game result of a gaming machine with use of an insurance management server by utilization of a membership card.

BACKGROUND

Related-art gaming machines include, e.g., a slot machine provided with an insurance function. When insurance coins (coins for activating the insurance function) is inserted into the slot machine in advance before initiation of a game, even when the number of consumed game start coins has reached a certain level and a player has failed to gain a win, a specified number of coins as dividend of the insurance (insurance dividend coins) are paid out to thereby lessen the loss of the player (e.g., see JP-A-4-244178).

However, the insurance function fulfilled by the insurance coins is limited to the services that have previously been set in the slot machine into which the insurance coins are to be inserted, such as payout of a specified number of insurance dividend coins according to the number of consumed game start coins. Accordingly, only a uniform insurance service can be provided, and obstacles are encountered in providing a variety of services that satisfy requests of the player.

SUMMARY

One of objects of the present invention is to provide a gaming management system capable of providing a variety of services satisfying the requests of the player in relation to the game insurance targeted for a game result of a gaming machine.

According to one aspect of the invention, there is provided a gaming management system including: a gaming machine that provides a game to a player; a member management server that is connected to the gaming machine through a computer network; and an insurance management server that is connected to the gaming machine and the member management server through the computer network. The gaming machine includes: a card unit that reads an ID number of a membership card; an authorization unit that permits playing of the game on the gaming machine when the card unit detects the membership card; a generation unit that generates game information pertaining to a result of the game; and an input unit that is provided on the card unit. The member management server includes a member management storage unit that stores member information associated with the ID number read by the card unit. The insurance management server includes: an insurance management storage unit that stores insurance information associated with the player as an insurant of a game insurance; a specifying unit that specifies the insurant based on the member information stored in the member management storage unit and the ID number read by the card unit; a game insurance payout determination unit that determines whether or not to pay the insurance coverage of the game insurance to the insurant specified by the specifying unit based on the game information generated by the generation unit and the insurance information stored in the insurance management storage unit; a halting unit that halts the determination of the game insurance payout determination unit based on the input to the input unit and stores the game information generated by the generation unit into the insurance management storage unit on condition that the insurant is specified by the specifying unit; an exemption unit that exempts the specification by the specifying unit when the determination by the game insurance payout determination unit is being halted by the halting unit; and a cancellation unit that cancels the halt of the game insurance payout determination unit based on the input to the input unit. The game insurance payout determination unit determines whether or not to pay the insurance coverage of the game insurance by addition of the game information stored in the insurance management storage unit when the halt of the game insurance payout determination unit is canceled by the cancellation unit.

According to another aspect of the invention, there is provided a gaming management system including: a gaming machine that provides a game to a player; a member management server that is connected to the gaming machine through a computer network; and an insurance management server that is connected to the gaming machine and the member management server through the computer network. The gaming machine includes: a game processing unit that provides the game to the player; a card unit that reads identification information stored in a membership card, the identification information being set unique to each of the membership cards; and a generation unit that generates game information pertaining to a result of the game; an input unit that allows the player to input a command. The member management server includes a member management storage unit that stores member information for identifying the player, the member information being associated with the identification information. The insurance management server includes: an insurance management storage unit that stores insurance information for the player as an insurant of a game insurance; a specifying unit that specifies the insurant based on the member information and the identification information; and a game insurance payout determination unit that determines whether or not to pay the insurance coverage of the game insurance to the insurant specified by the specifying unit based on the game information generated by the generation unit and the insurance information stored in the insurance management storage unit.

BRIEF DESCRIPTION OF THE DRAWINGS

In the accompanying drawings:

FIG. 10 is a view showing a flowchart of example control processing that can be performed by the gaming management system of the embodiment.

DETAILED DESCRIPTION

Figure 1:
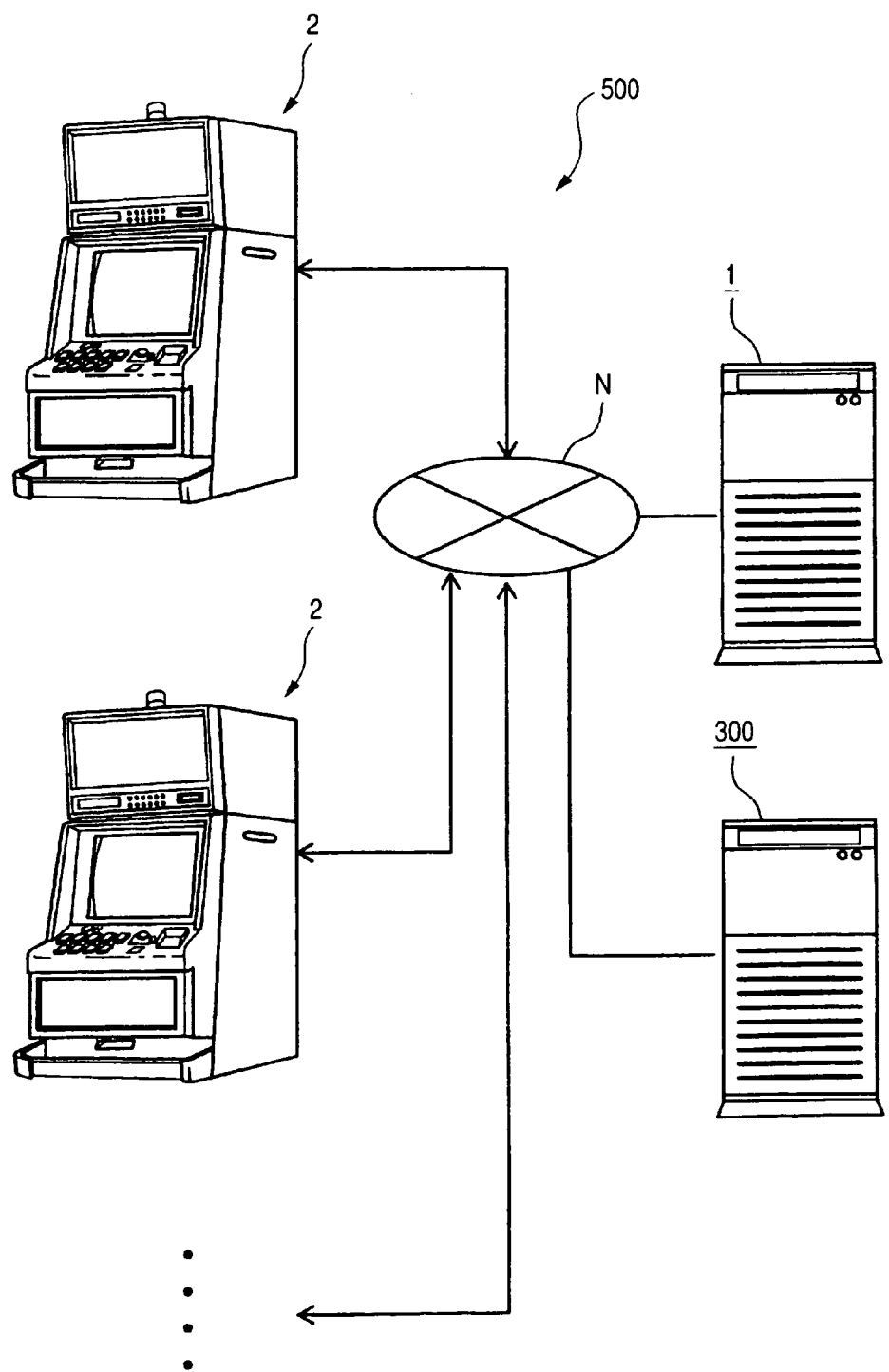
FIG. 1 shows an example gaming management system according to an embodiment where an insurance management server, a member management server, and gaming machines are connected together by way of a network.

An embodiment of the present invention will be described hereinbelow with reference to the drawings. First, the overview of a gaming management system of an embodiment will be described briefly. The gaming management system of the embodiment includes a plurality of gaming machines, each of which is provided with a card unit, a member management server, and an insurance management server, and all of these elements are connected to each other by way of a computer network.

The term "the game insurance" herein means a system where a large number of players, or the like, pay insurance expenses in case of losses induced by a game and given negotiable values, including game medium which will be described later, are paid as insurance coverage to a player who has induced a loss during a game, by means of taking the insurance expenses as funds. The insurance expenses and the insurance coverage may be paid by and to the player in a form of real money or in a form of the game medium.

Each of the card units reads an ID number stored in a membership card. The ID number stored in the membership card is provided in a one-to-one correspondence with a player (member) who owns the membership card. Therefore, the player who is playing a game on a gaming machine provided with the card unit can be identified based on the ID number stored in the membership card.

The member management server stores member information [e.g., name, address, date of birth, vital information (biometric data), the member's account number, and the like] about the member (a player) in correspondence with the ID number. The member information is managed for each member (player).

The insurance management server is for managing the game insurance of the member (player). The game insurance is a system for covering a loss incurred by a game in each gaming machine with insurance coverage on condition that a member (player) pays an insurance expense. In many cases, services of the insurance, including a special agreement such as an automatic update service, change according to details of an insurance contract made by each member (player). Accordingly, the insurance management server stores details of insurance of each member (player) including information about whether or not an insurance expense has been paid, in correspondence with the ID number. Thereby, the details of insurance are managed on a per-member (per-player) basis.

Moreover, a series of processes pertaining to the game insurance, from acceptance of a contract to payment of an insurance expense, are automated in the insurance management server. At that time, an ID number is acquired from each card unit in order to obtain details of the game insurance for each member (player), a member's account number from which an insurance expense is withdrawn or to which insurance coverage is transferred, and a game result of the gaming machine, the game result being covered by the game insurance. The member information is acquired from the member management server by utilization of the ID number, and the game result is acquired from the gaming machine.

The embodiment illustrates, as an example gaming machine, a gaming machine where a game play is performed by means of a game displayed on an image display device, such as an LCD panel. However, the embodiment is not limited to this type of gaming machine. For instance, a slot machine equipped with a plurality of mechanical reels which actually spin, a Pachinko gaming machine, or the like, may also be employed.

The embodiment employs "coins" as game medium to be used in a gaming machine. The term "coins" encompasses both hard currency (metal money) circulated in the economy of a country where the present invention is practiced, and game medals or tokens which are uniquely used in a game arcade—where the present invention is practiced—and are available for the player by means of exchanging the currency of the country where the invention is practiced.

In addition to coins, game balls, such as Pachinko balls, may be used as the game mediums for the gaming machine, such as a Pachinko gaming machine. In a gaming machine using a magnetic card or an IC card which stores numerical data into which the amount of game medium, such as coins, are converted, the numerical data may be used in place of coins.

Configuration of an Overall Gaming Management System

FIG. 1 shows an example gaming management system where an insurance management server and a member management server are connected to a plurality of gaming machines, which are communication terminals, by way of a computer network.

As shown in FIG. 1, in a gaming management system 500, the insurance management server 1 and the member management server 300 are connected to the plurality of gaming machines 2 by way of the network N configured by a communication line. The insurance management server 1, the member management server 300, and the gaming machines 2 are configured so as to be able to exchange various pieces of information by way of this network N.

In the regard, the insurance management server 1 and the member management server 300 exchange information with the plurality of gaming machines 2. The respective gaming machines 2 are provided with unique identification numbers. By means of the identification number, the senders of data transmitted from the respective gaming machines 2 are identified, and a destination to which data are to be sent is identified from the gaming machines 2.

Configuration of the Insurance Management Server

Figure 2:
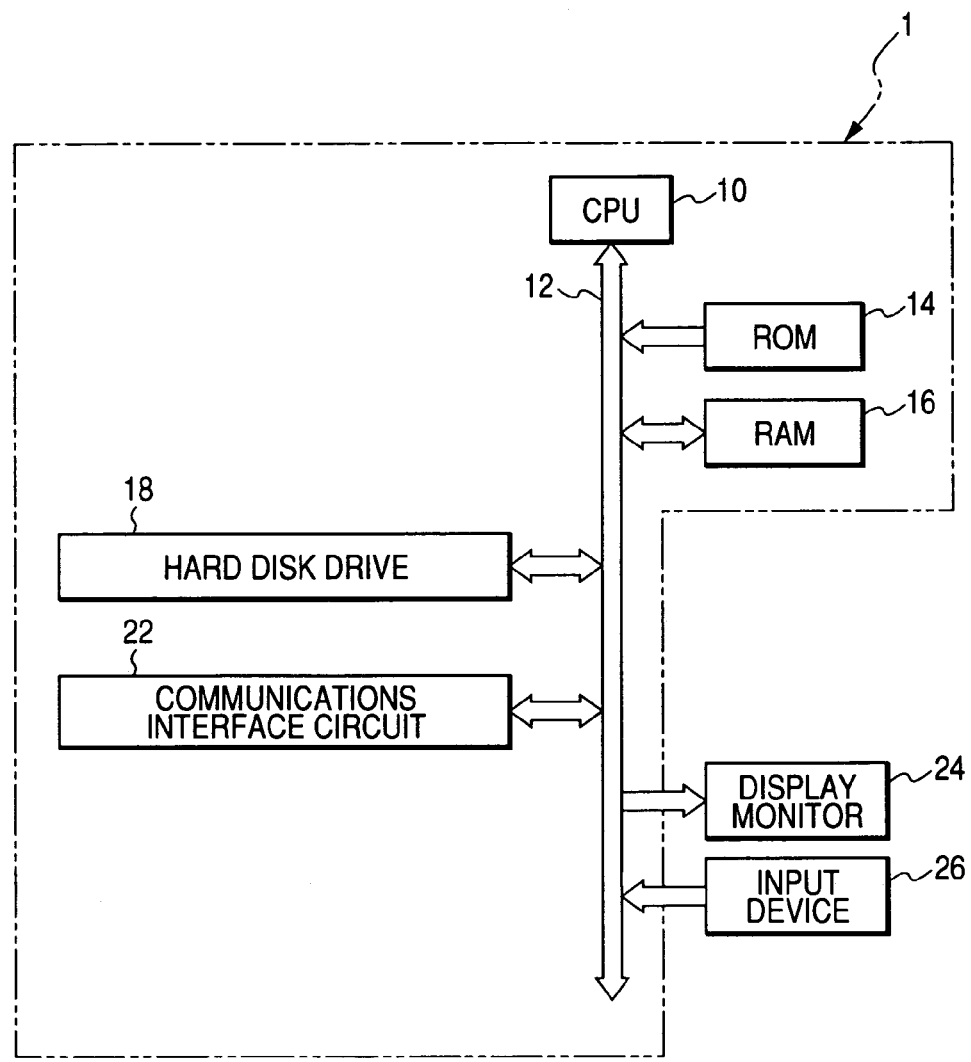
FIG. 2 is a block diagram showing a control circuit of the insurance management server of the embodiment.

FIG. 2 is a block diagram showing the configuration of the above-described insurance management server 1.

The insurance management server 1 has a central processing circuit (hereinafter referred to as a CPU) 10, and the CPU 10 is connected to an input/output bus 12. A configuration is made such that a data signal or an address signal is input to or output from the CPU 10.

The input/output bus 12 is also connected to ROM (read-only memory) 14 and RAM (random access memory) 16. The ROM 14 stores a control program for controlling the insurance management server 1, which will be described later. The RAM 16 stores flags or variables used in the above-described program. Moreover, the RAM 16 temporarily stores an ID number sent from a card unit 400, which will be described later, of the gaming machine 2; member information sent from the member management server 300 to be described later; game information delivered from the gaming machine 2 to be described later; and information about details of insurance in a hard disk drive 18 to be described later.

The input/output bus 12 is also connected to the hard disk drive 18 and a communications interface circuit 22. The hard disk drive 18 includes a database, or the like, where information about details of insurance is stored in correspondence with the ID number of the member (the player). As shown in FIG. 1, the communications interface circuit 22 is connected to the plurality of gaming machines 2 and the member management server 300, in a communicable manner, by way of the network N, which is a communication line such as a public switched telephone network or a local area network (LAN).

In the embodiment, the hard disk drive 18 is used as a storage device for storing information about details of insurance or the like. However, the storage device is not limited to the hard disk drive. Any device may be used, so long as the device is a nonvolatile rewritable mass storage device such as flash memory.

A display monitor 24 and an input device 26 are also connected to the input/output bus 12. The display monitor 24 can display various types of data, such as information about details of insurance, stored as a database, in the hard disk drive 18. The input device 26 can send, to the insurance management server 1, a command for displaying information, such as details of insurance, on the display monitor 24 and a command for causing the hard disk drive 18 to store new information about details of insurance.

Configuration of the Member Management Server

Figure 3:
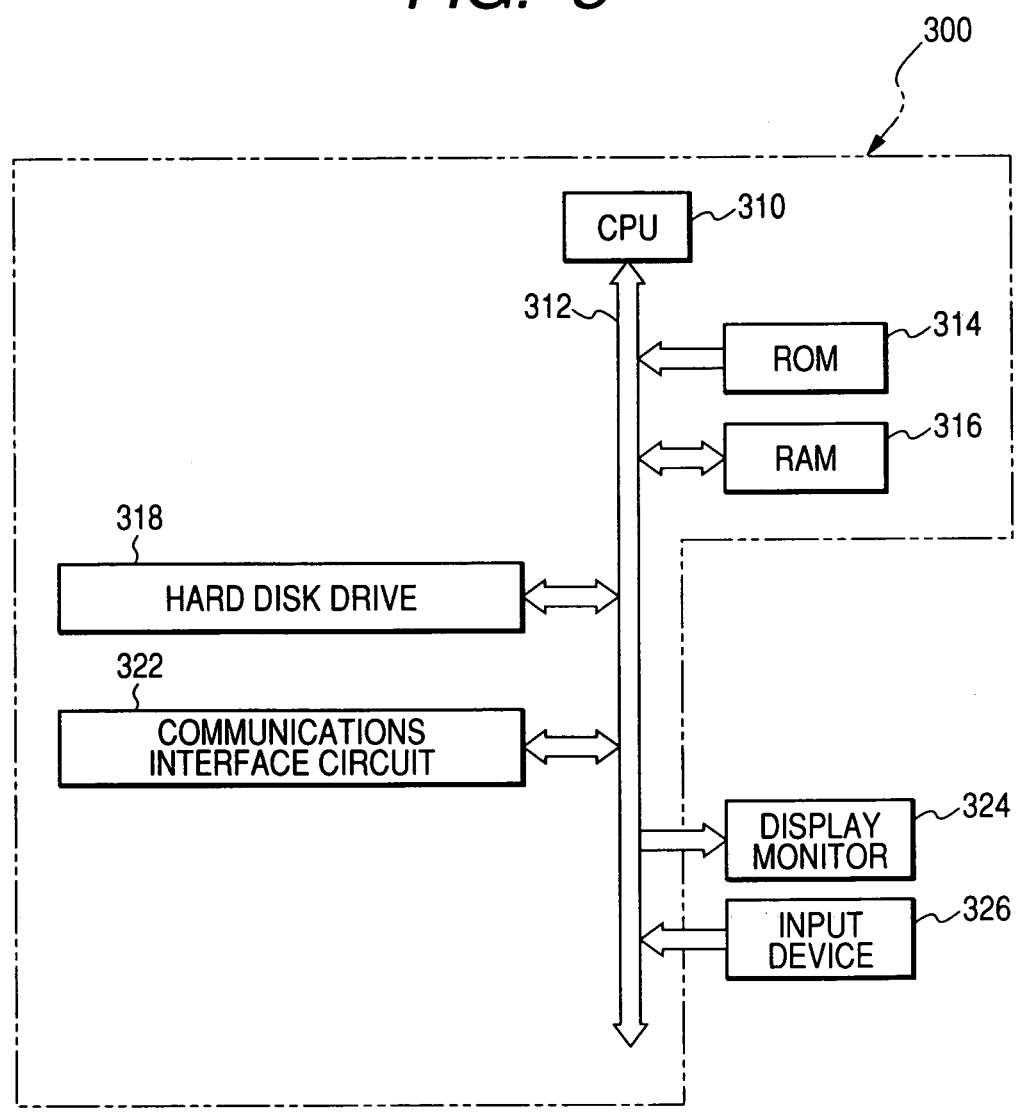
FIG. 3 is a block diagram showing a control circuit of the member management server of the embodiment.

FIG. 3 is a block diagram showing the configuration of the above-described member management server 300.

The member management server 300 has a CPU 310, and the CPU 310 is connected to an input/output bus 312, so that a data signal or an address signal is input to or output from the CPU 310.

The input/output bus 312 is connected to ROM 314 and RAM 316, as well. The ROM 314 stores a control program for controlling the member management server 300 to be described later. In the meantime, the RAM 316 stores flags or variables, which are used in the above-mentioned program. Moreover, the ID numbers sent from the insurance management server 1, which will be described later, and member information about a hard disk drive 318, which will be described later, are temporarily stored in the RAM 316.

The input/output bus 312 is also connected to the hard disk drive 318 and a communications interface circuit 322. The hard disk drive 318 stores a database, or the like, into which member information [e.g., name, address, date of birth, vital information (biometrics data), an account number of the member, and the like] is stored in correspondence with the ID number of the member (the player). A communications interface circuit 322 is connected in a communicable manner, as shown in FIG. 1, to the plurality of gaming machines 2 and the insurance management server 1, by way of the network N which is a communication line such as a public switched telephone network or a local area network (LAN). The member management server 1 serves as a master station of the plurality of gaming machines 2, and the identification number used for communication is set to "0000."

In the embodiment, the hard disk drive 318 is used as a storage device used for storing information such as the member information. However, the storage device is not limited to the hard disk drive. Any storage device may be used, so long as the device is a nonvolatile rewritable mass storage device such as flash memory.

The input/output bus 312 is also connected to a display monitor 324 and an input device 326. The display monitor 324 displays various data; for instance the member information [e.g., name, address, date of birth, vital information (biometrics data), an account number of the member, and the like] stored as a database in the hard disk drive 318. Further, the input device 326 can send, to the member management server 300, a command for causing the display monitor 324 to display member information and a command for causing the hard disk drive 318 to store new member information.

Configuration of the Gaming Machine

Figure 4:
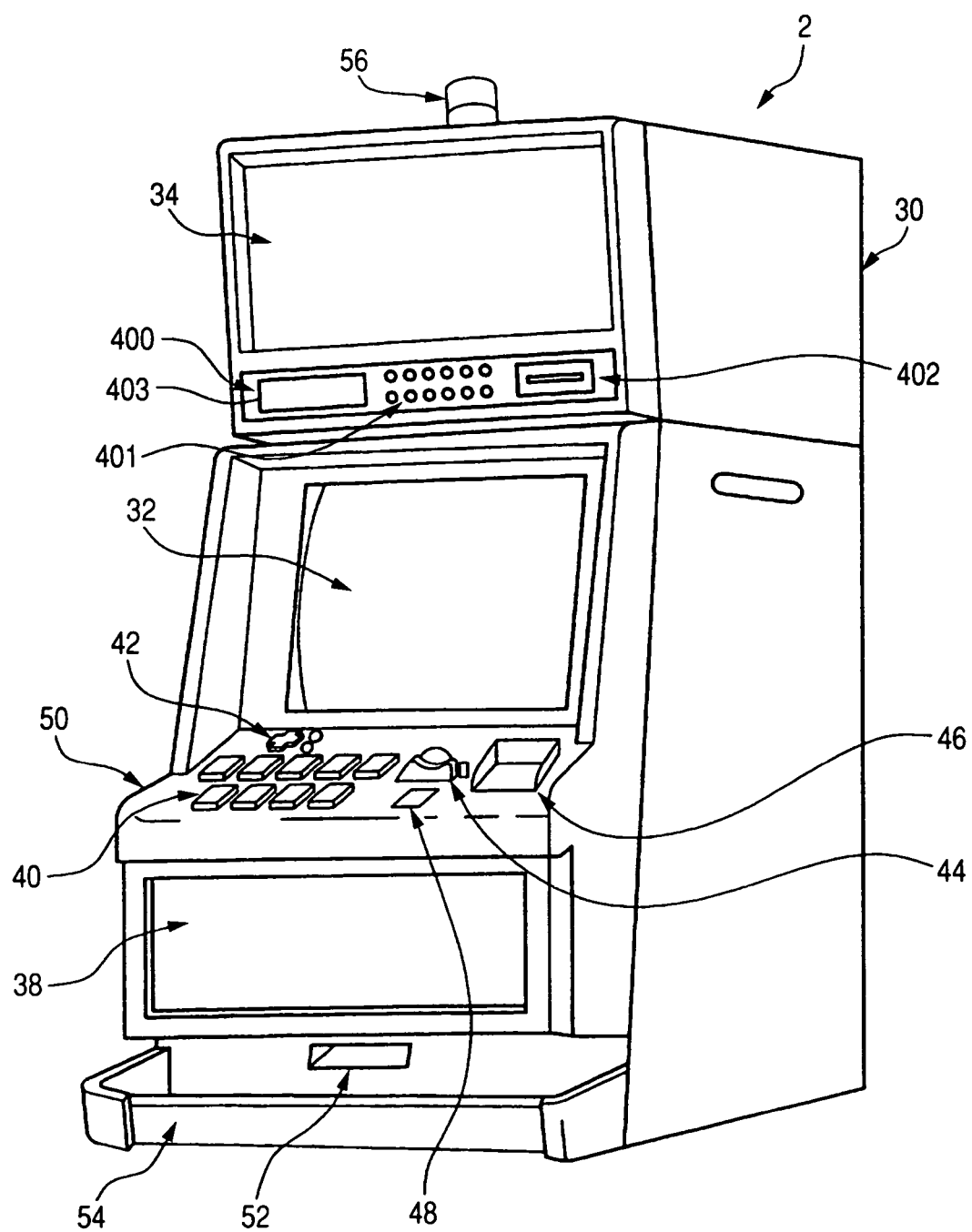
FIG. 4 is a perspective view showing the overview of the gaming machine of the embodiment.

FIG. 4 shows a perspective view of an example gaming machine 2 of the embodiment.

The gaming machine 2 is provided with a cabinet 30. A front center portion of the cabinet 30 is inclined so as to become slanted slightly rearward with respect to the vertical direction. A main display device 32 is provided on top of the slanted face. The main display device 32 displays game information about respective games, and the games proceed on the display device.

A sub-display device 34 is provided at a position above the main display device 32 on the front of the cabinet 30. The sub-display device 34 displays information, which cannot be displayed on the main display device 32, as well as rules about a game carried out on the main display device 32, or the like.

Further, the card unit 400 is interposed between the main display device 32 and the sub-display device 34. The card unit 400 has a plurality of buttons 401, a card insertion slot 402 into which a membership card is inserted, a display monitor 403, or the like. The plurality of buttons 401 are used for inputting an instruction in relation to an input of a security code or the discharge of a membership card. The display monitor 403 is used for prompting the player to input a security code or a command for discharge of a membership card. Since the membership card is subjected to reading and writing operations performed by a reader/writer 404 (see FIG. 5) which will be described later, an IC card is used.

A notification lamp 56 is provided on top of the cabinet 30.

An essentially-horizontal seat section 50 is provided beneath the main display device 32. A plurality of switches 40 and a cross switch 42 are provided on an upper left portion on the seat 50. These switches are used for issuing a command for selection or determination during games.

A coin insertion slot 44 and a paper money insertion port 46 are provided on an upper right surface of the seat section 50. As a result of insertion of coins or paper money into the slot or port, playing of a game becomes possible.

A payout switch 48 is also provided in the vicinity of the coin insertion slot 44. The inserted coins are paid from a coin payout port 52 formed in a front lower portion of the cabinet 30 as a result of the payout switch 48 being pressed. The thus-paid coins are accumulated in a coin-receiving section 54.

Another sub-display device 38 is provided at a position above the coin payout port 52 in a lower portion of the cabinet 30, and displays pieces of information of various types.

Configuration of a Controller of the Gaming Machine

Figure 5:
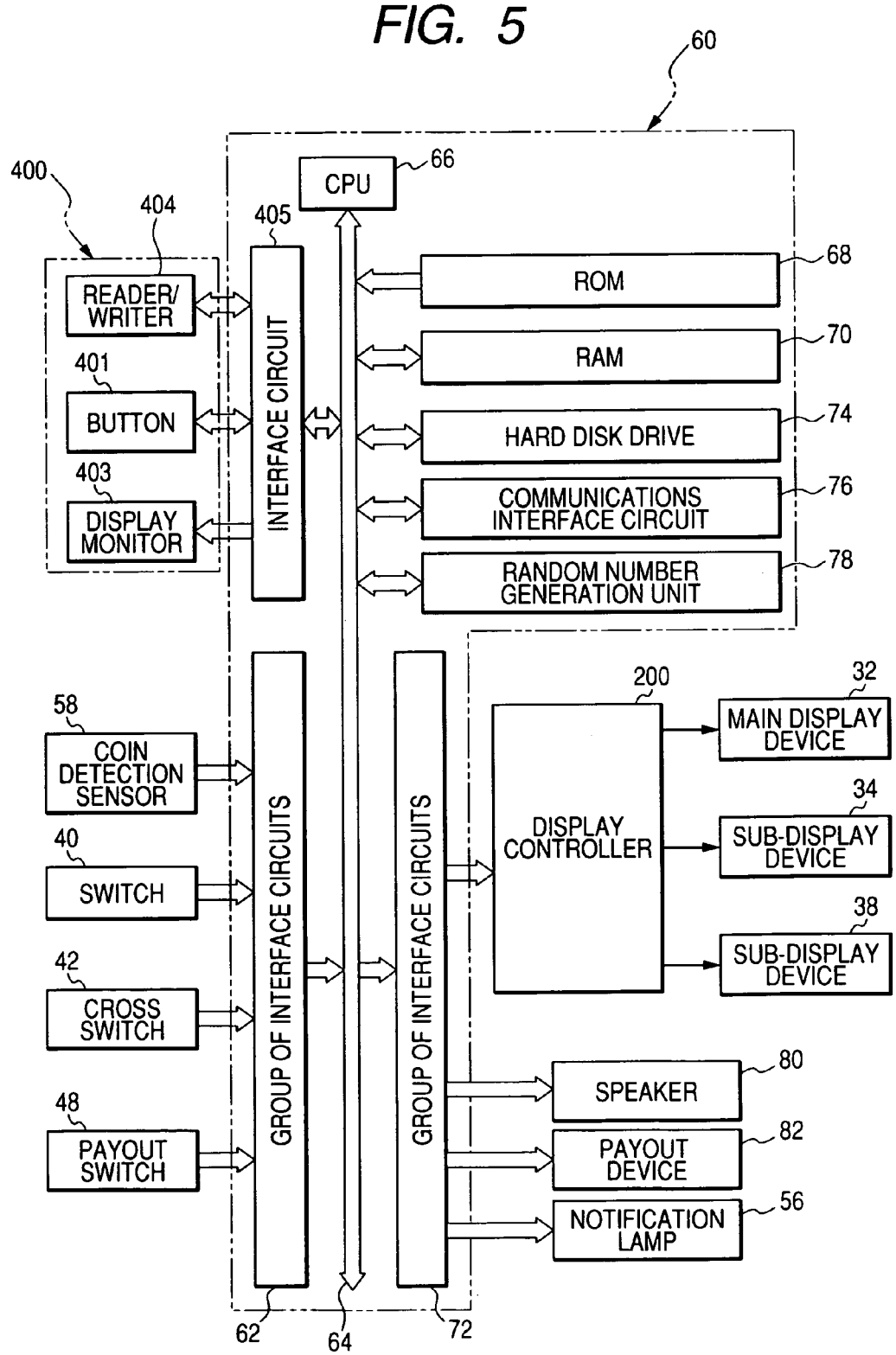
FIG. 5 is a block diagram showing a main control circuit for controlling the gaming machine of the embodiment.

FIG. 5 is a block diagram showing the configuration of a control section of the above-described gaming machine 2.

The switch 40 and the cross switch 42, which have been mentioned previously, are connected to a group of interface circuits 62 of a main control circuit 60. The group of interface circuits 62 is connected to an input/output bus 64. As a result of the respective switches being pressed, respective predetermined signals are generated and supplied to the input/output bus 64. The input/output bus 64 is arranged to enable a data signal or an address signal to be input to or output from a CPU 66.

The above-mentioned group of interface circuits 62 is connected to a coin detection sensor 58, as well. When a coin has been inserted into the coin insertion slot 44 or paper money has been inserted into the paper money insertion port 46, information about the type or number of inserted coins or sheets of paper money is converted into a signal, and the signal is supplied to the group of interface circuits 62.

The above-mentioned group of interface circuits 62 is connected to the payout switch 48, as well. When the player has pressed the payout switch 48, a predetermined signal is supplied to the input/output bus 64, and the inserted coin is paid out from the coin payout port 52, which will be described later, in accordance with the signal.

The identification (ID) number used for communication is set in each of the plurality of gaming machines 2. Thereby, the insurance management server 1 or the member management server 300 identifies the gaming machine.

The input/output bus 64 is also connected to ROM 68 and RAM 70. The ROM 68 stores a control program for controlling the flow of the entire system of the gaming machine. Moreover, the ROM 68 stores initial data used for executing the control program or portions of programs for controlling a display of the main display device 32 and the like. The RAM 70 stores the above program and flags or variables used in a game program to be described later.

The above input/output bus 64 is also connected to a hard disk drive 74.

In the embodiment, the hard disk drive 74 is used as a storage device for storing a game program or the like. However, the storage device is not limited to the hard disk drive. Any storage device may be used, so long as the device is a nonvolatile rewritable mass storage device such as flash memory.

A group of interface circuits 72 is also connected to the input/output bus 64. The group of interface circuits 72 is connected to a speaker 80, the notification lamp 56, and a payout device 82. The group of interface circuits 72 supplies a drive signal and drive power in order to control the above-described individual devices in accordance with the result of arithmetic processing performed by the CPU 66.

When the gaming machine 2 has detected an anomaly, the notification lamp 56 illuminates or blinks so as to call an attendant of the game arcade, to thus inform the attendant of the game arcade of detection of the anomaly.

The input/output bus 64 is further connected to a random number generation unit 78 which generates a random number. When a command for generating a random number has been issued by the CPU 66 to the random number generation unit 78, the random number generation unit 78 generates a predetermined range of random numbers, and a signal showing the value of the random number is sent to the input/output bus 64. The CPU 66 determines the status of a progress in a game by means of the thus-generated random number. The random number issued from the random number generation unit 78 is stored in the RAM 70 as data showing the result of a lottery.

The input/output bus 64 is connected to a communications interface circuit 76, as well. The communications interface circuit 76 is for establishing communication with the insurance management server 1, the member management server 300, and the like, by way of the network N, which is a communication line such as a as public switched telephone network or a local area network (LAN).

An interface circuit 405 is also connected to the input/output bus 64. The interface circuit 405 is connected to the reader/writer 404, the buttons 401, and the display monitor 403, all of which are provided within the card unit 400. In accordance with the result of arithmetic processing operation performed by the CPU 66, the interface circuit 405 supplies a drive signal and drive power in order to control the above-described individual devices.

When a membership card (IC card) has been inserted into the card insertion slot 402, the reader/writer 404 converts information, such as an ID number, stored in the membership card into a signal, and the signal is supplied to the interface circuit 405.

As a result of the respective buttons 401 being pressed, predetermined signals are generated and supplied to the interface circuit 405.

The display command issued by the CPU 66 is supplied to the display monitor 403 by way of the interface circuit 405, and the display monitor displays an image corresponding to the command.

The group of interface circuits 72 is also connected to a display controller 200. The display controller 200 issues a drive signal, which is used for driving the main display device 32 and the sub-display devices 34, 38 connected to the display controller 200, pursuant to an video display command issued by the main control circuit 60.

Configuration of the Display Controller of the Gaming Machine

Figure 6:
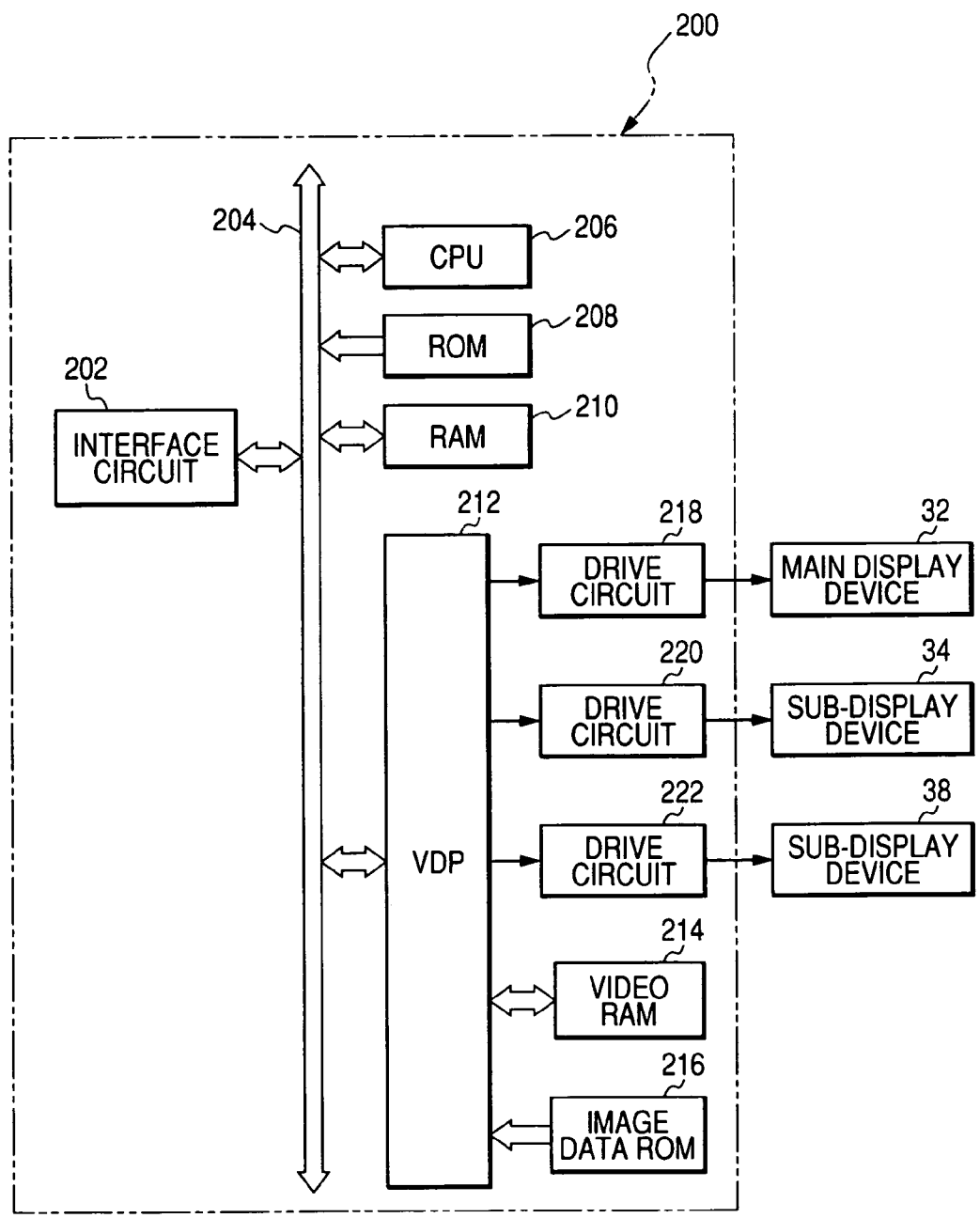
FIG. 6 is a block diagram showing a display controller of the gaming machine of the embodiment.

FIG. 6 shows a block diagram showing the circuit of the above-described display controller 200.

An interface circuit 202 is connected to an input/output bus 204, and a video display command issued by the main control circuit 60 is supplied to the input/output bus 204 by way of the interface circuit 202. The input/output bus 204 is arranged to enable a data signal or an address signal to be input to or output from a CPU 206.

The input/output bus 204 is connected to ROM 208 and RAM 210, as well. The ROM 208 stores a display control program used for generating a drive signal to be supplied to the main display device 32, in accordance with the video display command issued by the main control circuit 60. Meanwhile, the RAM 210 stores flags or variables used in the program.

A video data processor (hereinafter called a "VDP") 212 is also connected to the input/output bus 204. This VDP 212 is a processor which includes circuits, such as a so-called sprite circuit, a screen circuit, and a palette circuit, and which can perform various types of processing for displaying an image on the main display device 32.

The VDP 212 is connected to video RAM 214 for storing image data complying with the video display command issued by the main control circuit 60 and image data ROM 216 for storing background image data, pattern image data, character image data, and the like. Moreover, the VDP 212 is also connected to a drive circuit 218 for sending a drive signal used for driving the main display device 32, a drive circuit 220 for sending a drive signal used for driving the sub-display device 34, and a drive circuit 222 for sending a drive signal used for driving the sub-display device 38.

By means of reading and executing the display control program stored in the ROM 208, the CPU 206 causes the video RAM 214 to store image data which are to be displayed on the main display device 32 pursuant to the video display command sent from the main control circuit 60. The video display command issued from the main control circuit 60 includes a background display command, a pattern display command, a character display command, and the like.

As mentioned above, the image data ROM 216 stores image data, such as the pattern image data pertaining to a pattern image which is an identification information image; character image data pertaining to a character such as an animal displayed as a presentation screen; and background image data forming the background of the main display device 32, or the like.

The pattern image data are used for variably displaying or stationarily displaying a pattern on the main display device 32, or the like. The pattern image data include image data of a variety of display modes; e.g., an enlarged image, a scaled-down image, a modified image, or the like. The character image data include image data required to display modes where a character performs a round of actions.

Figure 7:
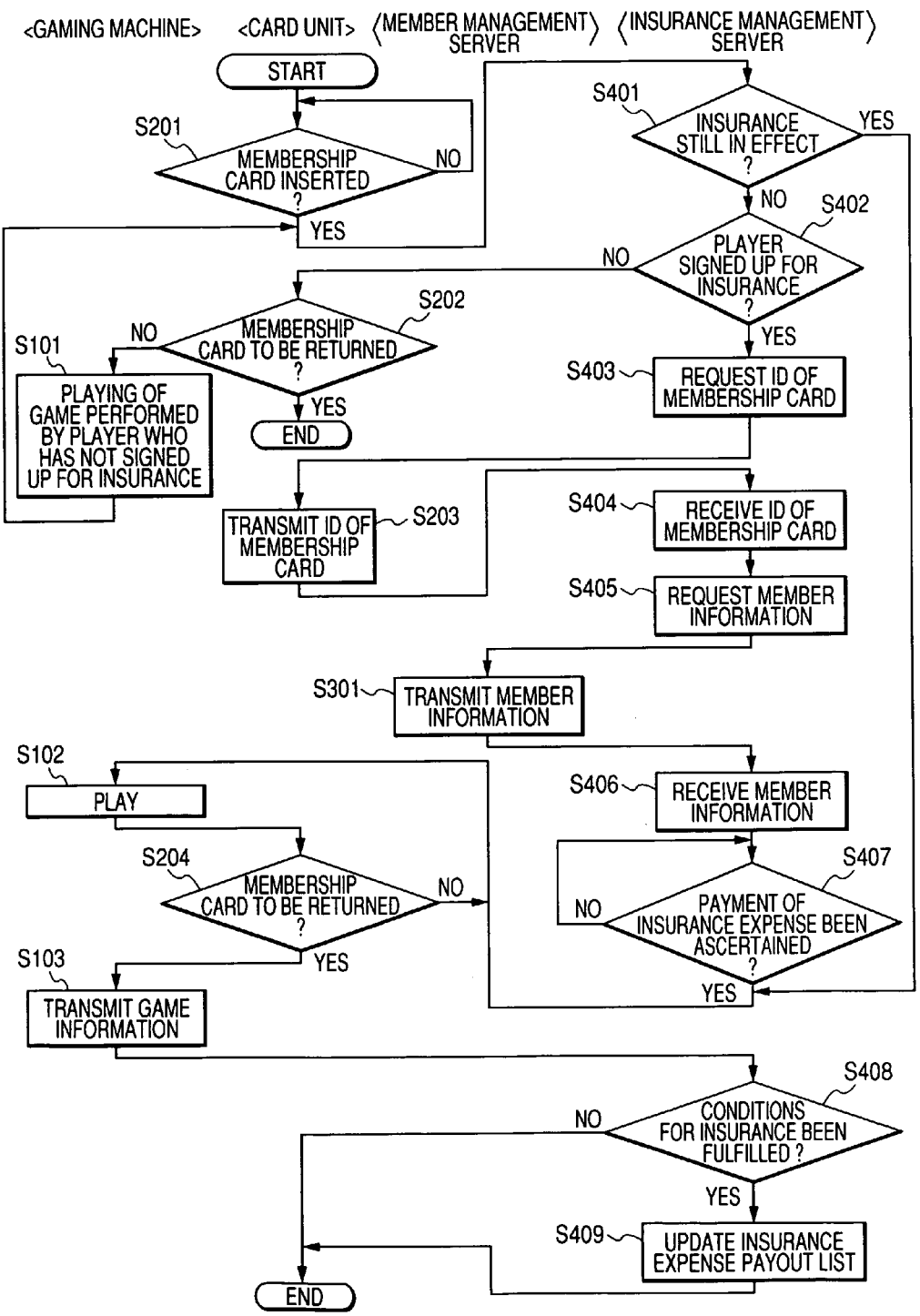
FIG. 7 is a view showing a flowchart of example control processing that can be performed by the gaming management system of the embodiment.

Control operations performed by the gaming management system 500 of the embodiment will now be described by reference to FIG. 7. FIG. 7 is a view showing the flow of example control processing which can be performed by the gaming management system 500 of the embodiment.

As shown in FIG. 7, in S201 the gaming management system 500 of the embodiment first awaits insertion of a membership card into the card insertion slot 402 pertaining to the card unit 400. When the CPU 66 of the gaming machine 2 provided with the card unit 400 has determined that a membership card has been inserted into the card insertion slot 402 by way of the reader/writer 404 (YES in S201), information about whether or not the member has signed up for the game insurance, which has been read from the membership card by the reader/writer 404, and information about whether or not the game insurance is still in effect, which has been read from the membership card by the reader/writer 404, are sent to the insurance management server 1, and processing subsequently proceeds to S401 pertaining to the insurance management server 1.

In S401 pertaining to the insurance management server 1, a determination is made as to whether or not the game insurance is still in effect, on the basis of the information about the continued effectiveness of the game insurance transmitted from the gaming machine 2 provided with the card unit 400. At this time, when the CPU 10 of the insurance management server 1 determines that the game insurance is no longer in effect (NO in S401), processing proceeds to S402. In S402, a determination is made as to whether or not the member has signed up for the game insurance, on the basis of the information about whether or not the member has signed up for the game insurance, which is transmitted from the gaming machine 2 provided with the card unit 400.

At this time, when the CPU 10 of the insurance management server 1 has determined that the member has not signed up for the game insurance (NO in S402), processing proceeds to S202 pertaining to the card unit 400, and a determination is made as to whether or not the membership card is to be returned (ejected) to the player. The CPU 66 of the gaming machine 2 provided with the card unit 400 causes the display monitor 403 of the card unit 400 to display a character message indicating, e.g., "Returning your membership card?," thereby prompting the player to determine whether the membership card is to be returned. As a result of the player pressing the button 401 of the card unit 400, the player's determination as to whether or not the membership card is to be returned is ascertained.

At this time, when the CPU 66 of the gaming machine 2 provided with the card unit 400 has determined that the membership card is not to be returned (NO in S202), processing proceeds to S101 pertaining to the gaming machine 2. In S101, the CPU 66 of the gaming machine 2 provided with the card unit 400 provides a game in a state in which not covered by the game insurance. Subsequently, processing returns to S401 pertaining to the insurance management server 1, whereby the above-described processing operations are repeated.

When the CPU 66 of the gaming machine 2 provided with the card unit 400 has determined that the membership card is to be returned (YES in S202), the membership card is discharged from the card insertion slot 402 by way of the reader/writer 404. Subsequently, this control processing control is terminated.

When, in S402 pertaining to the insurance management server 1, the CPU 10 of the insurance management server 1 has determined that the member has signed up for the game insurance (YES in S402), processing proceeds to S403. A signal requesting transmission of an ID number stored in the membership card is transmitted to the gaming machine 2 provided with the card unit 400. Subsequently, processing proceeds to S203 pertaining to the card unit 400.

In S203 pertaining to the card unit 400, the CPU 66 of the gaming machine 2 equipped with the card unit 400 transmits to the insurance management server 1 the ID number read from the membership card, by way of the reader/writer 404. Subsequently, processing proceeds to S404 pertaining to the insurance management server 1.

In S404 relating to the insurance management server 1, when the insurance management server 1 has received an ID number from the gaming machine 2 equipped with the card unit 400, processing proceeds to S405, where the CPU 10 of the insurance management server 1 transmits, to the member management server 300, a signal requesting transmission of member information associated with the ID number. Subsequently, processing proceeds to S301 relating to the member management server 300.

In S301 relating to the member management server 300, the CPU 310 of the member management server 300 transmits the member information about the ID number, which has been read from the hard disk drive 318, to the insurance management server 1 by reference to the ID number. Then, processing proceeds to S406 relating to the insurance management server 1.

When in S406 the insurance management server 1 has received the member information from the member management server 300 relating to the insurance management server 1, processing proceeds to S407, where the CPU 10 of the insurance management server 1 determines whether or not the member (player) identified by the ID number has paid the insurance expense of the game insurance, by reference to the ID number and on the basis of the information about the details of insurance read from the hard disk drive 18.

At that time, when the CPU 10 of the insurance management server 1 determines that the member (player) identified by the ID number has not finished paying the insurance expense of the game insurance (NO in S407), processing returns to S407. The CPU 10 awaits ascertainment that the insurance expense of the game insurance pertaining to the member (player) identified by the ID number has been paid as a result of, for instance, an insurance expense being withdrawn from the member's account whose number has been acquired from the member information about the member (player) specified by the ID number, or the member (player) identified by the ID number directly paying the insurance expense.

When the CPU 10 of the insurance management server 1 determines that the member (player) identified by the ID number has finished paying the insurance expense of the game insurance (YES in S407), processing proceeds to S102 relating to the gaming machine 2. Also in S401, even when the CPU 10 of the insurance management server 1 determines that the game insurance is still in effect (YES in S401), processing proceeds to S102 relating to the gaming machine 2.

In S102 relating to the gaming machine 2, the CPU 66 of the gaming machine 2 equipped with the card unit 400 provides the game in a state in which being covered by the game insurance. Subsequently, processing proceeds to S204 relating to the card unit 400, where a determination is made as to whether or not the membership card is to be returned. The CPU 66 of the gaming machine 2 equipped with the card unit 400 causes the display monitor 403 of the card unit 400 to display a character message of, e.g., "Returning your membership card?," to thus prompt the member (player) to determine whether to return the membership card. As a result of the player pressing the buttons 401 of the card unit 400, the player's determination as to whether or not the membership card is to be returned is ascertained.

At that time, when the CPU 66 of the gaming machine 2 equipped with the card unit 400 determines that the membership card is not to be returned (NO in S204), processing returns to S102 pertaining to the gaming machine 2, and the processing operations set above are repeated.

When the CPU 66 of the gaming machine 2 equipped with the card unit 400 determines that the membership card is to be returned (YES in S204), the membership card is discharged from the card insertion slot 402 by way of the reader/writer 404. Subsequently, processing proceeds to S103 pertaining to the gaming machine 2.

In S103 pertaining to the gaming machine 2, the CPU 66 of the gaming machine 2 equipped with the card unit 400 transmits the game information about a result of the game being covered by the game insurance, to the insurance management server 1. Then, processing proceeds to S408 pertaining to the insurance management server 1.

In S408 pertaining to the insurance management server 1, the CPU 10 of the insurance management server 1 determines whether or not the member (player) identified by the ID number has fulfilled conditions for insurance payout; namely, whether or not insurance coverage is to be paid out, on the basis of the game information sent from the gaming machine 2 equipped with the card unit 400 and the information about details of insurance read from the hard disk drive 18 by means of the ID number.

At that time, when the CPU 10 of the insurance management server 1 determines payout of insurance coverage (YES in S408), processing proceeds to S409, where an insurance coverage payout list is updated in association with payout of insurance coverage; namely, information about details of insurance in the hard disk drive 18 is rewritten by utilization of the ID number. Subsequently, this control processing is terminated. In the meantime, when the CPU 10 of the insurance management server 1 determines not to pay insurance coverage (NO in S408), this control processing is terminated without performing any further process.

In the gaming management system 500 of the embodiment, even when the player (member) plays a game in a state in which being covered by the game insurance, on a plurality of gaming machines 2 during the course of the control processing shown in FIG. 7 being performed, a determination can be made as to whether or not insurance coverage is to be paid by means of a single determination operation by combination of the games that are covered by the game insurance.

Figure 9:
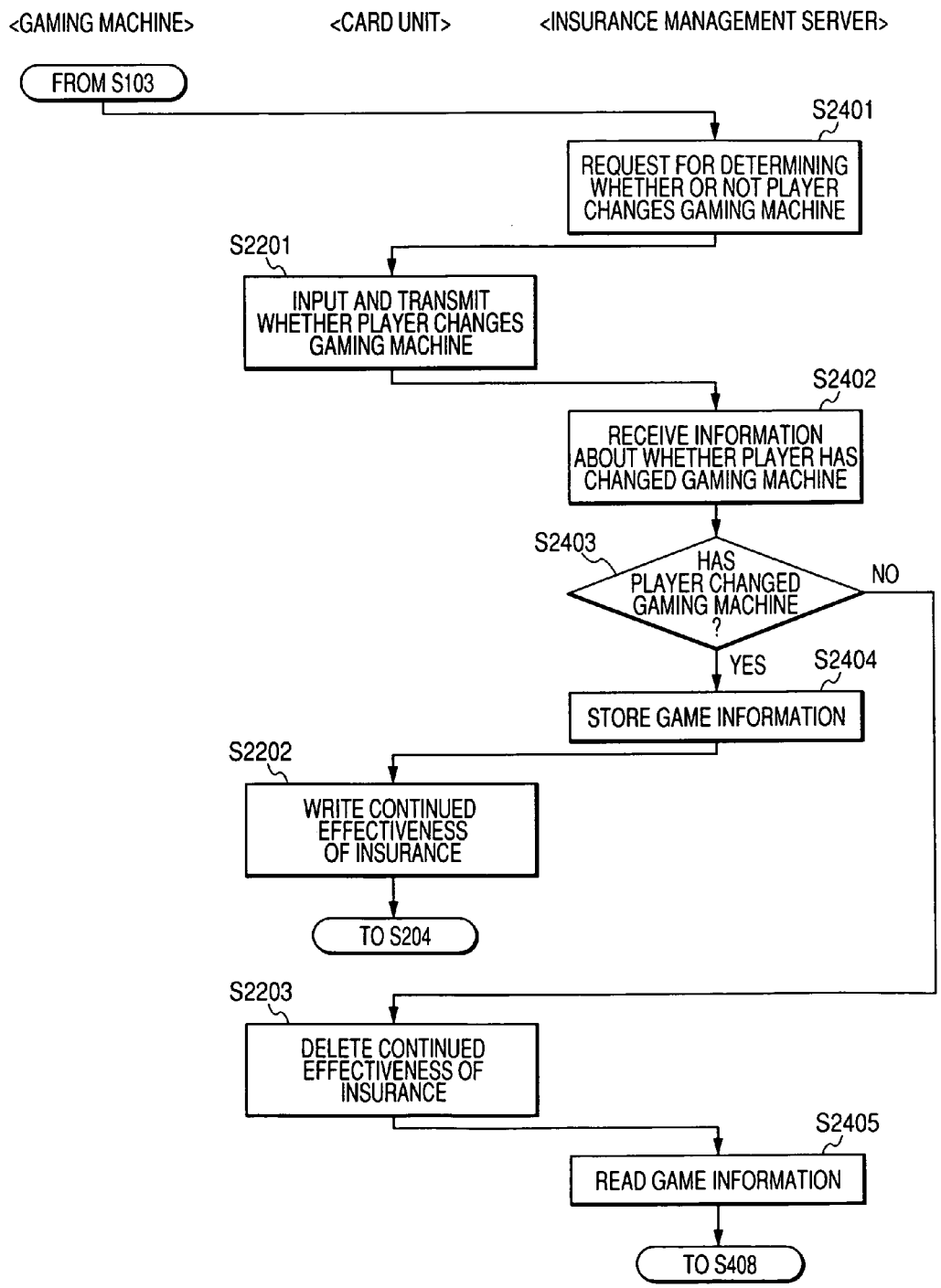
FIG. 9 is a view showing a flowchart of example control processing that can be performed by the gaming management system of the embodiment.

To this end, in the gaming management system 500 of the embodiment, the CPU 66 of the gaming machine 2 equipped with the card unit 400 determines return of the membership card in S204 pertaining to the card unit 400 that is in the course of control processing shown in FIG. 7 (YES in S204), processing proceeds to S103 pertaining to the gaming machine 2 that is in the course of control processing shown in FIG. 7, without discharge of the membership card from the card insertion slot 402. Immediately after processing pertaining to S103 has been performed, control processing shown in FIG. 9 must be performed. Control processing shown in FIG. 9 will now be described. FIG. 9 is a view showing a flowchart of example control processing that can be performed by the gaming management system 500 of the embodiment.

Immediately after there has been performed processing pertaining to S103 relating to the gaming machine 2 that is in the course of control processing shown in FIG. 7, control processing shown in FIG. 9 is performed. First, processing proceeds to S2401 relating to the insurance management server 1, where the CPU 10 of the insurance management server 1 transmits, to the gaming machine 2 equipped with the card unit 400, a signal that requests transmission of information about whether or not the player changes the gaming machine; namely, whether or not the game, in which being covered by the game insurance, is played on another gaming machine 2. Subsequently, processing proceeds to S2201 pertaining to the card unit 400.

In S2201 pertaining to the card unit 400, information about whether or not the player changes the gaming machine; namely, whether or not the game, in which being covered by the game insurance, is played on another gaming machine 2, is input or transmitted. Specifically, the CPU 66 of the gaming machine 2 equipped with the card unit 400 causes the display monitor 403 of the card unit 400 to display a character message of, e.g., "Do you wish to continue to play a game on another gaming machine in a state in which being covered by the game insurance?," to thus prompt the player to determine whether to play the game in a sate in which being covered by the game insurance, on another gaming machine 2. As a result of the payer pressing the buttons 401 on the card unit 400, the player's determination as to whether to play the game, in which being covered by the game insurance, on another gaming machine 2, is ascertained.

The CPU 66 of the gaming machine 2 equipped with the card unit 400 transmits, to the insurance management server 1, information about whether or not the player changes a gaming machine; namely, whether or not the game being covered by the game insurance is played on another gaming machine 2. Subsequently, processing proceeds to S2402 pertaining to the insurance management server 1.

In S2402 pertaining to the insurance management server 1, when the insurance management server 1 has received, from the gaming machine 2 equipped with the card unit 400, information about whether or not the player changes a gaming machine; namely, whether or not the game being covered by the game insurance, is played on another gaming machine 2, processing proceeds to S2403. On the basis of the thus-received information, the CPU 10 of the insurance management server 1 determines whether or not the player changes a gaming machine; namely, whether or not the game being covered by the game insurance, is played on another gaming machine 2.

At that time, the CPU 10 of the insurance management server 1 determines that the player changes a gaming machine; namely, that the game being covered by the game insurance is played on another gaming machine 2 (YES in S2403), processing proceeds to S2404. The CPU 10 of the insurance management server 1 stores the game information, which has been output from the gaming machine 2 equipped with the card unit 400, in the hard disk drive 18 while affixing the information with the ID number. Subsequently, processing proceeds to S2202 pertaining to the card unit 400.

In S2202 pertaining to the card unit 400, the CPU 66 of the gaming machine 2 equipped with the card unit 400 writes data pertaining to continued effectiveness (coverage) of insurance into the information about continued effectiveness of the game insurance in the membership card by way of the reader/writer 404 of the card unit 400. Subsequently, when the membership card is discharged (ejected) from the card insertion slot 402, the control processing is terminated.

When in S2403 pertaining to the insurance management server 1 the player is determined not to change a gaming machine; namely, the player is determined not to play the game being covered by the game insurance on another gaming machine 2 (NO in S2403), processing proceeds to S2203 relating to the card unit 400.

In S2203 pertaining to the card unit 400, the CPU 66 of the gaming machine 2 equipped with the card unit 400 deletes the data pertaining to continued effectiveness of insurance from the information about continued effectiveness of the game insurance in the membership card by way of the reader/writer 404 of the card unit 400. Then, processing proceeds to S2405 relating to the insurance management server 1.

In S2405 relating to the insurance management server 1, the CPU 10 of the insurance management server 1 reads the game information that is stored in the hard disk drive 18 while being affixed with the ID number. Processing proceeds to S408 pertaining to the insurance management server 1 that is in the course of control processing shown in FIG. 7.

Thereby, in S408 pertaining to the insurance management server 1 that is in the course of control processing shown in FIG. 7, the CPU 10 of the insurance management server 1 determines whether or not the member (player) identified by the ID number fulfills the conditions for insurance payout; namely, whether or not insurance coverage is paid, on the basis of the game information stored in the hard disk drive 18 while being affixed with the ID number as well as on the basis of the game information sent from the gaming machine 2 equipped with the card unit 400 and the information about details of insurance read from the hard disk drive 18 by reference to the ID number.

When control processing shown in FIG. 7 has been performed by the gaming management system 500 of the embodiment, the CPU 10 of the insurance management server 1 determines whether to pay insurance coverage when the membership card is discharged from the card unit 400 by way of the card insertion slot 402 (YES in S204); namely, upon completion of the game played on the gaming machined 2 equipped with the card unit 400 (S408).

In contrast with control processing shown in FIG. 7, the timing when the CPU 10 of the insurance management server 1 determines whether to pay insurance coverage can be set for every each game provided on the gaming machine 2 is completed (e.g., every time the reels of the slot machine have stopped spinning) rather than when the whole round of games provided on the gaming machine 2 is completed (e.g., when the player quits playing games on the gaming machine 2).

Figure 8:
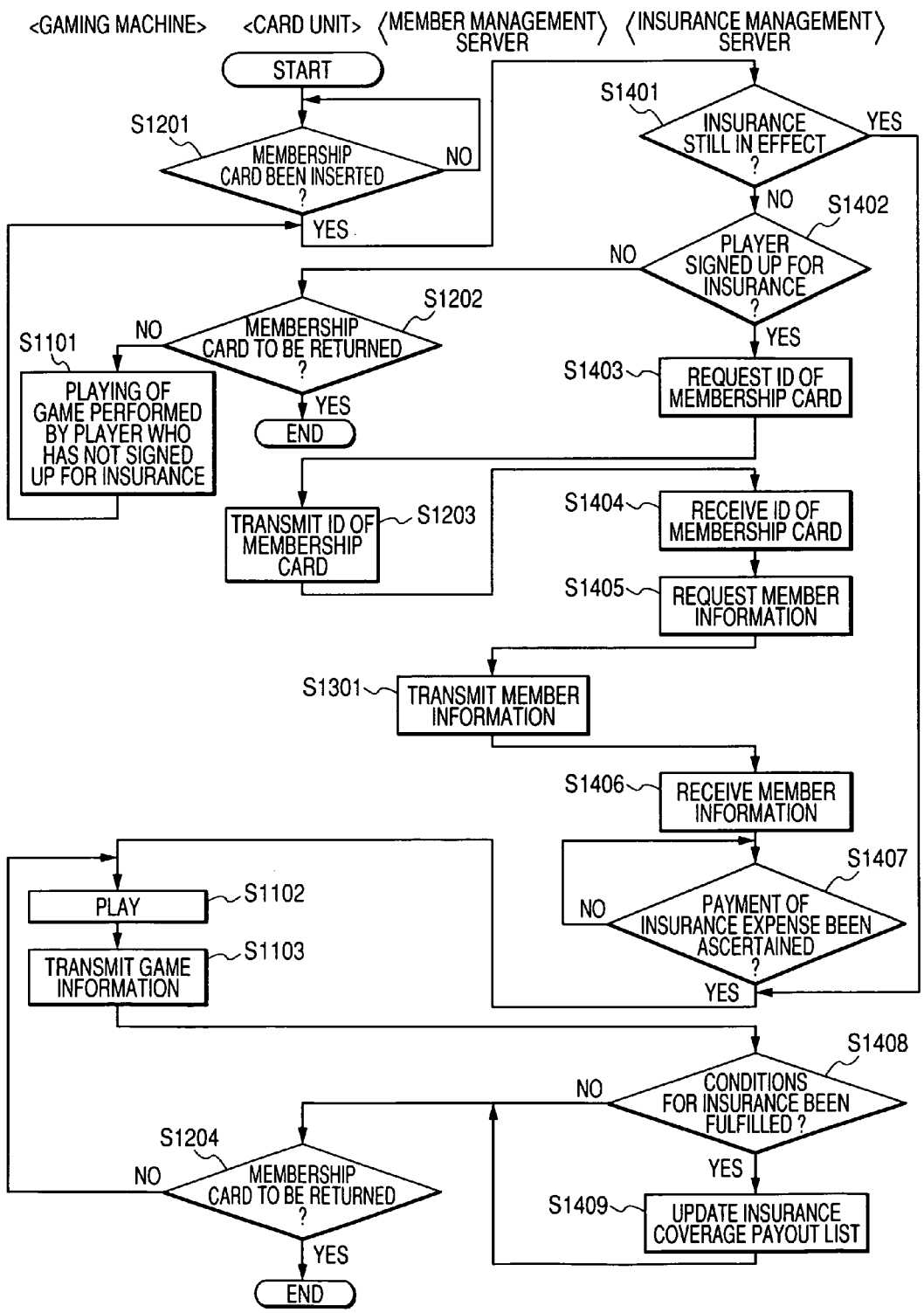
FIG. 8 is a view showing a flowchart of example control processing that can be performed by the gaming management system of the embodiment.

With reference to FIG. 8, there will now be described control processing of the gaming management system 500 of the embodiment for setting the timing when the CPU 10 of the insurance management server 1 determines whether to pay insurance coverage when every each game provided on the gaming machine 2 is completed. FIG. 8 is a view showing the flowchart of example control processing that can be performed by the gaming management system of the embodiment.

As shown in FIG. 8, in S1201 pertaining to the card unit 400, the gaming management system 500 of the embodiment awaits insertion of a membership card into the card insertion slot 402. When the CPU 66 of the gaming machine 2 equipped with the card unit 400 has determined that the membership card has been inserted into the card insertion slot 402 by way of the reader/writer 404 (YES in S1201), information about whether or not the player has signed up for the game insurance, which has been read from the membership card by the reader/writer 404, and information about continued effectiveness of the game insurance read from the membership card by means of the reader/writer 404, are sent to the insurance management server 1. Subsequently, processing proceeds to S1401 pertaining to the insurance management server 1.

In S1401 pertaining to the insurance management server 1, a determination is made as to whether or not the game insurance remains in effect, on the basis of the information about continued effectiveness of the game insurance transmitted from the gaming machine 2 equipped with the card unit 400. At this time, when the CPU 10 of the insurance management server 1 has determined that the game insurance is no longer in effect (NO in S1401), processing proceeds to S1402. In S1402, a determination is made as to whether or not the player has signed up for the game insurance, on the basis of the information about whether or not the player has signed up for the game insurance that has been transmitted from the gaming machine 2 equipped with the card unit 400.

In S1402 pertaining to the insurance management server 1, a determination is made as to whether or not the player has signed up for the game insurance, on the basis of the information about whether or not the player has signed up for the game insurance, which has been transmitted from the gaming machine 2 equipped with the card unit 400.

At this time, when the CPU 10 of the insurance management server 1 has determined that the player has not signed up for the game insurance (NO in S1402), processing proceeds to S1202 pertaining to the card unit 400, where a determination is made as to whether or not the membership card is to be returned. The CPU 66 of the gaming machine 2 equipped with the card unit 400 causes the display monitor 403 of the card unit 400 to display a character message of, e.g., "Returning your membership card?," to thus prompt the player to determine whether or not the membership card is to be returned. As a result of the player pressing the buttons 401 on the card unit 400, the player's determination as to whether or not the membership card is to be returned is ascertained.

When the CPU 66 of the gaming machine 2 equipped with the card unit 400 has determined not to return the membership card (NO in S1202), processing proceeds to S1101 pertaining to the gaming machine 2. In S1101, the CPU 66 of the gaming machine 2 equipped with the card unit 400 provides a game in a state in which not being covered by the game insurance. Subsequently, processing returns to S1401 pertaining to the insurance management server 1, and above-described processing is repeated.

When the CPU 66 of the gaming machine 2 equipped with the card unit 400 has determined to return the membership card (YES in S1202), the membership card is discharged from the card insertion slot 402 by way of the reader/writer 404. Subsequently, control processing is terminated.

In S1402 pertaining to the insurance management server 1, when the CPU 10 of the insurance management server 1 determines that the player has signed up for the game insurance (YES in S1402), processing proceeds to S1403. A signal that requests transmission of the ID number stored in the membership card is transmitted to the gaming machine 2 equipped with the card unit 400. Subsequently, processing proceeds to S1203 pertaining to the card unit 400.

In S1203 pertaining to the card unit 400, the CPU 66 of the gaming machine 2 equipped with the card unit 400 transmits, to the insurance management server 1, the ID number read from the membership card by way of the reader/writer 404. Subsequently, processing proceeds to S1404 pertaining to the insurance management server 1.

In S1404 relating to the insurance management server 1, when the insurance management server 1 has received the ID number from the gaming machine 2 equipped with the card unit 400, processing proceeds to S1405. The CPU 10 of the insurance management server 1 transmits, to the member management server 300, a signal that requests transmission of member information associated with the ID number. Subsequently, processing proceeds to S1301 pertaining to the member management server 300.

In S1301 pertaining to the member management server 300, the CPU 310 of the member management server 300 transmits, to the insurance management server 1, the member information about the ID number read from the hard disk drive 318 by utilization of the ID number. Subsequently, processing proceeds to S1406 pertaining to the insurance management server 1.

In S1406 pertaining to the insurance management server 1, when the insurance management server 1 has received the member information from the member management server 300, processing proceeds to S1407. The CPU 10 of the insurance management server 1 determines that the member (player) identified by the ID number has finished paying the insurance expense of the game insurance, on the basis of the information about details of insurance read from the hard disk drive 18 by means of the ID number.

At that time, the CPU 10 of the insurance management server 1 has determined that the member identified by the ID number has not yet finished paying an insurance expense for the game insurance (NO in S1407), processing returns to S1407. The CPU 10 awaits ascertainment that the insurance expense of the game insurance pertaining to the member (player) identified by the ID number has been paid as a result of, for instance, an insurance expense being withdrawn from the member's account whose number has been acquired from the member information about the member (player) specified by the ID number or the member (player) identified by the ID number directly paying the insurance expense.

When the CPU 10 of the insurance management server 1 determines that the member (player) identified by the ID number has finished paying the insurance expense of the game insurance (YES in S1407), processing proceeds to S1102 relating to the gaming machine 2. Even in S1401, even when the CPU 10 of the insurance management server 1 determines that the game insurance remains in effect (YES in S1401), processing proceeds to S1102 relating to the gaming machine 2.

In S1102 relating to the gaming machine 2, the CPU 66 of the gaming machine 2 equipped with the card unit 400 provides the game in a state in which being covered by the game insurance. Subsequently, processing proceeds to S1103, where the CPU 66 of the gaming machine 2 equipped with the card unit 400 transmits, to the insurance management server 1, game information about a result of the game being covered by the game insurance, (a result of one game). Subsequently, processing proceeds to S1408 pertaining to the insurance management server 1.

In S1408 pertaining to the insurance management server 1, the CPU 10 of the insurance management server 1 determines whether or not the member (player) identified by the ID number has fulfilled conditions for insurance payout; namely, whether or not insurance coverage is to be paid out, on the basis of the game information sent from the gaming machine 2 equipped with the card unit 400 and the information about details of insurance read from the hard disk drive 18 by means of the ID number.

At that time, when the CPU 10 of the insurance management server 1 determines payout of insurance coverage (YES in S1408), processing proceeds to S1409, where an insurance coverage payout list is updated in association with payout of insurance coverage; namely, information about details of insurance in the hard disk drive 18 is rewritten by utilization of the ID number. Subsequently, processing proceeds to S1204 pertaining to the card unit 400. In the meantime, the CPU 10 of the insurance management server 1 determines not to pay insurance coverage (NO in S1408), processing proceeds to S1204 pertaining to the card unit 400 without performing any further processing.

In S1204 pertaining to the card unit 400, a determination is made as to whether or not the membership card is to be returned. The CPU 66 of the gaming machine 2 equipped with the card unit 400 causes the display monitor 403 of the card unit 400 to display a character message of, e.g., "Returning your membership card?," to thus prompt the player to determine whether or not the membership card is to be returned. As a result of the player pressing the buttons 401 on the card unit 400, the player's determination as to whether or not the membership card is to be returned is ascertained.

At this time, when the CPU 66 of the gaming machine 2 equipped with the card unit 400 has determined not to return the membership card (NO in S1204), processing returns to S1102, the processing operations set forth are repeated.

When the CPU 66 of the gaming machine 2 equipped with the card unit 400 has determined to return the membership card (YES in S1204), the membership card is discharged from the card insertion slot 402 by way of the reader/writer 404. Subsequently, control processing is terminated.

In the gaming management system 500 of the embodiment, even when the player (member) plays a game being covered by the game insurance on a plurality of gaming machines 2 during the course of the control processing shown in FIG. 8 being performed, a determination can be made as to whether or not insurance coverage is to be paid by means of a single determination processing operation by combination of the games that are covered by the game insurance.

To this end, in the gaming management system 500 of the embodiment, control processing shown in FIG. 10 must be performed immediately after there has been performed processing pertaining to S1103 relating to the gaming machine 2 that is in the course of control processing shown in FIG. 8. Control processing shown in FIG. 10 will now be described. FIG. 10 is a view showing a flowchart of example control processing that can be performed by the gaming management system 500 of the embodiment.

Immediately after there has been performed processing pertaining to S1103 relating to the gaming machine 2 that is in the course of control processing shown in FIG. 8, control processing shown in FIG. 10 is performed. First, processing proceeds to S3401 relating to the insurance management server 1, where the CPU 10 of the insurance management server 1 transmits, to the gaming machine 2 equipped with the card unit 400, a signal that requests transmission of information about whether or not the player changes the gaming machine; namely, whether or not the game being covered by the game insurance is played on another gaming machine 2. Subsequently, processing proceeds to S3201 pertaining to the card unit 400.

In S3201 pertaining to the card unit 400, information about whether or not the player changes the gaming machine; namely, whether or not the game being covered by the game insurance is played on another gaming machine 2, is input or transmitted. Specifically, the CPU 66 of the gaming machine 2 equipped with the card unit 400 causes the display monitor 403 of the card unit 400 to display a character message of, e.g., "Do you wish to continue to play a game on another gaming machine in a state in which being covered by the game insurance?," to thus prompt the player to determine whether to play the game being covered by the game insurance on another gaming machine 2. As a result of the payer pressing the buttons 401 on the card unit 400, the player's determination as to whether to play the game being covered by the game insurance on another gaming machine 2, is ascertained.

The CPU 66 of the gaming machine 2 equipped with the card unit 400 transmits, to the insurance management server 1, information about whether or not the player changes a gaming machine; namely whether or not the game being covered by the game insurance is played on another gaming machine 2. Subsequently, processing proceeds to S3402 pertaining to the insurance management server 1.

In S3402 pertaining to the insurance management server 1, when the insurance management server 1 has received, from the gaming machine 2 equipped with the card unit 400, information about whether or not the player changes a gaming machine; namely whether or not the game being covered by the game insurance is played on another gaming machine 2, processing proceeds to S3403. On the basis of the thus-received information, the CPU 10 of the insurance management server 1 determines whether or not the player changes a gaming machine; namely, whether or not the game being covered by the game insurance is played on another gaming machine 2.

At that time, the CPU 10 of the insurance management server 1 determines that the player changes a gaming machine; namely, that the game being covered by the game insurance is played on another gaming machine 2 (YES in S3403), processing proceeds to S3404. The CPU 10 of the insurance management server 1 stores the game information, which has been output from the gaming machine 2 equipped with the card unit 400, in the hard disk drive 18 while affixing the information with the ID number. Subsequently, processing proceeds to S3202 pertaining to the card unit 400.

In S3202 pertaining to the card unit 400, the CPU 66 of the gaming machine 2 equipped with the card unit 400 writes data pertaining to continued effectiveness of insurance into the information about continued effectiveness of the game insurance in the membership card by way of the reader/writer 404 of the card unit 400. Subsequently, processing proceeds to S1204 pertaining to the card unit 400 that is in the course of control processing shown in FIG. 8.

If in S3403 pertaining to the insurance management server 1 the player is determined not to change a gaming machine; namely, the player is determined not to play the game being covered by the game insurance on another gaming machine 2 (NO in S3403), processing proceeds to S3203 relating to the card unit 400.

In S3203 pertaining to the card unit 400, the CPU 66 of the gaming machine 2 equipped with the card unit 400 deletes the data pertaining to continued effectiveness of insurance from the information about continued effectiveness of the game insurance in the membership card by way of the reader/writer 404 of the card unit 400. Then, processing proceeds to S3405 relating to the insurance management server 1.

In S3405 relating to the insurance management server 1, the CPU 10 of the insurance management server 1 reads the game information that is stored in the hard disk drive 18 while being affixed with the ID number. Processing proceeds to S1408 pertaining to the insurance management server 1 that is in the course of control processing shown in FIG. 8.

Thereby, in S1408 pertaining to the insurance management server 1 that is in the course of control processing shown in FIG. 8, the CPU 10 of the insurance management server 1 determines whether or not the member (player) identified by the ID number fulfills the conditions for insurance payout; namely, whether or not insurance coverage is paid, on the basis of the game information stored in the hard disk drive 18 while being affixed with the ID number as well as on the basis of the game information sent from the gaming machine 2 equipped with the card unit 400 and the information about details of insurance read from the hard disk drive 18 by reference to the ID number.

Accordingly, when the gaming management system 500 of the embodiment has performed control processing shown in FIGS. 7 to 10, the CPU 66 of each of the gaming machines 2 serves as "generation unit" when executing processing pertaining to S103 shown in FIG. 7 or processing pertaining to S1103 shown in FIG. 8; or serves as "authorization unit" when executing processing pertaining to S204 shown in FIG. 7 or processing pertaining to S1204 shown in FIG. 8. When executing processing pertaining to S407 shown in FIG. 7 or processing pertaining to S1407 shown in FIG. 8, the CPU 10 of the insurance management server 1 serves as "specifying unit." When executing processing pertaining to S408 shown in FIG. 7 or processing pertaining to S1408 shown in FIG. 8, the CPU 10 serves as "the game insurance payout determination unit." When executing processing pertaining to S401 shown in FIG. 7 or processing pertaining to S1401 shown in FIG. 8, the CPU 10 serves as "exemption unit." When executing processing pertaining to S2403 shown in FIG. 9 or processing pertaining to S3403 shown in FIG. 8, the CPU 10 serves as "halting unit" or "cancellation unit."

As has been described in detail, in the gaming management system 500 of the embodiment, with regard to the game insurance targeted to a game result of each gaming machine 2, the CPU 10 of the insurance management server 1 determines, in S408 shown in FIG. 7 or S1408 shown in FIG. 8, whether to pay insurance coverage of the game insurance, on the basis of the game information transmitted from each gaming machine 2 in S103 shown in FIG. 7 or S1103 shown in FIG. 8. Even when details of an insurance contract made by each player changes, a variety of services fulfilling players' demands can be provided by utilization of information about the details of insurance stored in the hard disk drive 18 of the insurance management server 1.

In the gaming management system 500 of the embodiment, the CPU 10 of the insurance management server 1 identifies the member (player), who is a insurant of the game insurance, in S408 shown in FIG. 7 or S1408 shown in FIG. 8, on the basis of the ID number of the membership card transmitted from the card unit 400 in S203 shown in FIG. 7 or S1203 shown in FIG. 8 by way of the gaming machine 2 and the member information transmitted from the member management server 300 in S301 shown in FIG. 7 or S1301 shown in FIG. 8 by way of the hard disk drive 318. Even when details of the insurance contract made by each player change, a variety of services fulfilling players' demands can be provided by utilization of the member information stored in the hard disk drive 318 of the member management server 300.

In the gaming management system 500 of the embodiment, when the member (player), who is an insurant of the game insurance, attempts to play a game on another gaming machine 2 after having played a game on one gaming machine 2, the member (player), who is an insurant of the game insurance, inputs and transmits information to the effect of playing a game being covered by the game insurance on another gaming machine 2, in S2201 shown in FIG. 9 or S3201 shown in FIG. 10, by means of the buttons 401 of the card unit 400 of the one gaming machine 2, on condition that the member (player), who is an insurant of the game insurance, has been identified in S408 shown in FIG. 7 or S1408 shown in FIG. 8. Thereby, the CPU 10 of the insurance management server 1 is caused to determine, in S2403 shown in FIG. 9 or S3403 shown in FIG. 10, that the player plays a game being covered by the game insurance on another gaming machine 2 (YES in S2403, YES in S3403). Thus, making a determination as to whether or not insurance coverage of the game insurance is paid, which is to be rendered in S408 shown in FIG. 7 or S1408 shown in FIG. 8, is halted.

Subsequently, the member (player), who has played a game on another gaming machine 2 and is an insurant of the game insurance, inputs and transmits information to the effect of not playing a game being covered by the game insurance on another gaming machine 2, in S2201 shown in FIG. 9 or S3201 shown in FIG. 10 by means of the buttons 401 of the card unit 400 of the one gaming machine 2. Thereby, the CPU 10 of the insurance management server 1 is caused to determine, in S2403 shown in FIG. 9 or S3403 shown in FIG. 10, that the player does not play a game being covered by the game insurance on another gaming machine 2 (NO in S2403, NO in S3403). Thus, a halt of making a determination as to whether or not insurance coverage of the game insurance is paid, which is to be rendered in S408 shown in FIG. 7 or S1408 shown in FIG. 8, is canceled.

When having canceled a halt of making of a determination, the CPU 10 of the insurance management server 1 determines, in S103 shown in FIG. 7 or S1103 shown in FIG. 8, whether or not the member (player) identified by the ID number fulfills the conditions for insurance payout; namely, whether or not insurance coverage is paid, on the basis of the game information stored in the hard disk drive 18 while being affixed with the ID number; i.e., the game information sent from the one gaming machine 2, in addition to on the basis of the game information transmitted from the other gaming machine 2 and the information about details of insurance stored in the hard disk drive 18 of the insurance management server 1. Accordingly, even when the member (player), who is an insurant of the game insurance, has moved from one gaming machine 2 to another gaming machine 2 and played the game on that machine, game results of the two gaming machines can be covered by the game insurance.

As matter of course, even when the member (player), who is an insurant of the game insurance, has moved among three or more gaming machines 2, game results of the gaming machines can be covered by the game insurance.

The present invention is not limited to the embodiments provided above and susceptible to various modifications without departing from the gist of the invention.

For instance, in relation to the gaming management system 500 of the embodiment, the following cases are conceivable as a mode of making a contract for the game insurance. Specifically, the member (player), who is an insurant of the game insurance, causes the card unit 400 to be able to determine an ID number of a membership card, and causes the main display unit 32 or the sub-display devices 34, 38 of the gaming machine 2 to display a screen by means of which a player takes out insurance. When the member has performed operation for taking out insurance on the gaming machine 2, the member management server 300 is caused to transmit member information associated with the ID number of the membership card to the insurance management server 1. Thereby, the insurance management server 1 withdraws an insurance expense from the account whose number is acquired from the member information, and information about details of insurance is stored in the hard disk drive 18, thereby making the contract of the game insurance come into effect. Alternatively, payment of an insurance expense may also be carried out by cash, and the contract for the game insurance may be brought into effective in writing. The insurance management server 1 may store information about details of insurance into the hard disk drive 18 by means of the input device 26.

As described in detail with reference to the embodiment, according to one aspect, there is provided a gaming management system (e.g., a gaming management system 500) which has a plurality of gaming machines (e.g., gaming machines 2), a member management server (e.g., a member management server 300), and an insurance management server (e.g., an insurance management server 1) and which connects the gaming machines (e.g., the gaming machines 2), the member management server (e.g., the member management server 300), and the insurance management server (e.g., the insurance management server 1) by way of a network (e.g., a network N), wherein the gaming machine (e.g., the gaming machine 2) has a card unit (e.g. a card unit 400) which is additionally provided on the gaming machine (e.g., the gaming machine 2) and reads an ID number of a member card, an authorization unit (e.g., a CPU 66, S204 and S1204) for permitting playing of a game on the gaming machine (e.g., the gaming machine 2) on condition that the card unit has detected the member card, a generation unit (e.g., the CPU 66, S103 and S1103) for generating game information pertaining to a game result of the gaming machine (e.g., the gaming machine 2), and an input unit (e.g., buttons 401) provided on the card unit (e.g., the card unit 400); the member management server (e.g., the member management server 300) has a member management storage unit (e.g., a hard disk drive 318) which stores member information assigned to the ID number read by the card unit (e.g., the card unit 400) of the gaming machine (e.g., the gaming machine 2); and the insurance management server (e.g., the insurance management server 1) has an insurance management storage unit (e.g., a hard disk drive 18) which stores insurance information assigned to a subject of the game insurance, a specifying unit (e.g., a CPU 10, S407 and S1407) which specifies member information stored in the member management storage unit (e.g., the hard disk drive 318) of the member management server (e.g., the member management server 300) and a subject of the game insurance on the basis of an ID number read by the card unit (e.g., the card unit 400) of the gaming machine (e.g., the gaming machine 2), a game insurance payout determination unit (e.g., the CPU 10, S408 and S1408) which determines whether or not insurance coverage of the game insurance is paid to the subject of the game insurance specified by the specifying unit (e.g., the CPU 10, S407 and S1407), on the basis of game information from the generation unit (e.g., the CPU 66, S103 and S1103) of the gaming machine (e.g., the gaming machine 2) and insurance information stored in the insurance management storage unit (e.g., the hard disk drive 18), a halting unit (e.g., the CPU 10, S2403 and S3403) for halting execution of the game insurance payout determination unit (e.g., the CPU 10, S408 and S1408), on the basis of input information from the input unit (e.g., the buttons 401) of the card unit (e.g., the card unit 400) on condition that the subject of the game insurance has been specified by the specifying unit (e.g., the CPU 10, S407 and S1407), and for storing into the insurance management storage unit (e.g., the hard disk drive 18) game information from the generation unit (e.g., the CPU 66, S103 and S1103) of the gaming machine (e.g., the gaming machine 2), an exemption unit (e.g., the CPU 10, S401 and S1401) for exempting execution of the specifying unit (e.g., the CPU 10, S401 and S1401), the exemption unit for exempting execution of the specifying unit during the course of execution of the game insurance payout determination unit (e.g., the CPU 10, S408 and S1408) being halted, and a cancellation unit (e.g., the CPU 10, S2403 and S3403) for canceling halt of execution of the game insurance payout determination unit (e.g., the CPU 10, S2403 and S3403) on the basis of information input from the input unit (e.g., the buttons 401) of the card unit (e.g., the card unit 400), wherein, when halt of execution of the game insurance payout determination unit (e.g., the CPU 10, S408 and S1408) has been canceled, the game insurance payout determination unit (e.g., the CPU 10, S408 and S1408) determines whether or not to pay insurance coverage of the game insurance, by addition of the game information stored in the insurance management storage unit (e.g., the hard disk drive 18).

In the gaming management system thus configured, with regard to the game insurance targeted for a game result of a gaming machine, the insurance management server determines whether to pay insurance coverage of the game insurance, on the basis of the game information output from the gaming machine and the insurance information output from the insurance management server. Hence, a variety of services meeting players' demands can be provided by utilization of insurance information from the insurance management server.

In the gaming management, the insurance management server specifies the subject of the game insurance on the basis of the ID number read by the card unit of the gaming machine and the member information in the member management server. Hence, a variety of services meeting players' demands can be provided by utilization of member information from the member management server.

In the gaming management system, when the insurant (player) of the game insurance attempts to play a game on another gaming machine after having finished playing a game on one gaming machine, the insurant of the game insurance causes the insurance management server to stop making a determination as to whether or not insurance coverage of the game insurance is to be paid, by means of the input information sent from input unit of the card unit of one gaming machine, on condition that the subject of the game insurance has been specified. Moreover, stopping of a determination is canceled by means of the input information sent from input unit of the card unit of the other gaming machine, whereby a determination can be made as to whether or not insurance coverage of the game insurance is to be paid on the basis of the game information sent from the one gaming machine as well as on the basis of the game information sent from the other gaming machine and the insurance information sent from the insurance management server. Accordingly, even when the insurant of the game insurance plays a game after having moved among a plurality of gaming machines, the results of games can be covered by the game insurance.

In the embodiment described above, the data indicating that the continuation of effectiveness (coverage) of the game insurance to a subsequent game provided by another gaming machine is written in the membership card by the reader/writer 404 provided in the card unit 400. However, there may be configured that the data indicating the continuation of the coverage of the game insurance may be written in the insurance information stored in the insurance management server 1. In this case, an insurance management storage unit (e.g., the hard disk drive 18) updates the insurance information stored therein when a game processing unit (e.g., the CPU 66) terminates to provide the game.

The present invention can be applied to a gaming management system that performs a round of processes from establishment of a contract for the game insurance to payout of insurance coverage by use of a membership card.

The foregoing description of the embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable those skilled in the art to utilize the invention in various embodiments and with various modifications as are suited to the particular use contemplated. It is intended that the scope of the invention be defined by the claims appended hereto, and their equivalents.

What is claimed is:

1. A gaming management system, comprising:
a gaming machine configured to provide a game to a player;
a member management server that is connected to the gaming machine through a computer network; and
an insurance management server that is connected to the gaming machine and the member management server through the computer network,
wherein the gaming machine comprises:
a game processing unit configured to provide the game to the player;
a card unit, including an input unit and a display unit, configured
to read an ID number of a membership card when the membership card is inserted into the card unit,
to retain the membership card in the card unit while the game processing unit is providing the game,
to eject the membership card when a command to eject the membership card is input through the input unit,
to display on the display unit a character message to prompt the player to determine whether coverage of game insurance is to be continued in a subsequent game provided by another gaming machine, and
to write in the membership card information indicating that the coverage of the game insurance is to be continued in the subsequent game provided by the another gaming machine when ejecting the membership card, when a command to continue the coverage of the game insurance in the subsequent game is input through the input unit;
an authorization unit configured to permit playing of the game on the gaming machine when the card unit detects the membership card; and
a generation unit configured to generate game information pertaining to a result of the game,
wherein the member management server comprises a member management storage unit configured to store member information associated with the ID number read by the card unit, and
wherein the insurance management server comprises:

an insurance management storage unit configured to store insurance information associated with the player as an insurant of the game insurance;

a specifying unit configured to specify the insurant based on the member information stored in the member management storage unit and the ID number read by the card unit;

a game insurance payout determination unit configured to determine whether or not to pay the insurance coverage of the game insurance to the insurant specified by the specifying unit based on the game information generated by the generation unit and the insurance information stored in the insurance management storage unit;

a halting unit configured to halt the determination of the game insurance payout determination unit based on the command input to the input unit to continue the coverage of the game insurance in the subsequent game, responding to the character message displayed on the display unit, and to store the game information generated by the generation unit into the insurance management storage unit on condition that the insurant is specified by the specifying unit;

an exemption unit configured to exempt the specification by the specifying unit when the determination by the game insurance payout determination unit is being halted by the halting unit; and a cancellation unit configured to cancel the halt of the game insurance payout determination unit based on a command input to the input unit to discontinue the coverage of the game insurance in the subsequent game, responding to the character message displayed on the display unit, wherein the game insurance payout determination unit determines whether or not to pay the insurance coverage of the game insurance by addition of the game information stored in the insurance management storage unit when the halt of the game insurance payout determination unit is canceled by the cancellation unit.

2. The gaming management system according to claim 1, wherein the card unit allows the game processing unit to provide the game to the player when the ID number is read from the membership card.

3. The gaming management system according to claim 1, wherein the game processing unit provides the game in a state in which the game is covered by the game insurance when the player is specified as the insurant by the specifying unit, and provides the game in a state in which the game is not covered by the game insurance when the player is not specified as the insurant by the specifying unit.

4. The gaming management system according to claim 1, wherein the insurance management storage unit updates the insurance information when the game processing unit terminates the game.

5. The gaming management system according to claim 1, wherein the game insurance payout determination unit is configured to determine whether or not to pay the insurance coverage of the game insurance to the insurant specified by the specifying unit each time the game provided on the gaming machine is completed.

* * * * *